(12) United States Patent
Tsai (10) Patent No.: US 8,582,014 B2
(45) Date of Patent: Nov. 12, 2013

(54) LENS FRONT CAP MODULE AND IMAGE PICKUP APPARATUS THEREOF

(75) Inventor: Yi-Yuan Tsai, Hemei Township (TW)

(73) Assignee: Altek Corporation, Hsinchu (TW)

( * ) Notice: Subject to any disclaimer, the term of this patent is extended or adjusted under 35 U.S.C. 154(b) by 137 days.

(21) Appl. No.: 13/417,828

(22) Filed: Mar. 12, 2012

(65) Prior Publication Data
US 2013/0176477 A1    Jul. 11, 2013

(30) Foreign Application Priority Data
Jan. 6, 2012  (TW) .............................. 101100644 A (51) Int. Cl.
*H04N 5/225*    (2006.01)

(52) U.S. Cl.
USPC ............ 348/340; 348/360; 348/375; 348/373

(58) Field of Classification Search
USPC .................. 348/335, 340, 374, 360, 361, 375
See application file for complete search history.

(56) References Cited

U.S. PATENT DOCUMENTS

| | | | |
|---|---|---|---|
| 2001/0017662 A1* | 8/2001 | Nomura et al. | 348/358 |
| 2001/0017736 A1* | 8/2001 | Nomura et al. | 359/699 |
| 2005/0254145 A1* | 11/2005 | Tsuzuki | 359/701 |

* cited by examiner

*Primary Examiner* — Tuan Ho
*Assistant Examiner* — Selam Gebriel
(74) *Attorney, Agent, or Firm* — Wang Law Firm, Inc.; Li K. Wang; Stephen Hsu (57) ABSTRACT

A lens front cap module and an image pickup apparatus having a zooming barrel, a focusing barrel and a lens front cap body. Both zooming barrel and focusing barrel are hollow barrel shaped structures. The focusing barrel is installed in the zooming barrel. An abutting portion is formed on an inner wall of the zooming barrel. The lens front cap body comprises a driving plate and a vane module. The driving plate is installed at an end of the zooming barrel and has a central window aperture. A driving pin is axially extended from the driving plate. The vane module is disposed on a side of the zooming barrel for shielding or unshielding the central window aperture. When the abutting portion abuts the driving pin, the driving pin drives the driving plate to rotate, and to drive the vane module to shield the central window aperture.

16 Claims, 8 Drawing Sheets

LENS FRONT CAP MODULE AND IMAGE PICKUP APPARATUS THEREOF

CROSS-REFERENCE TO RELATED APPLICATION

This application claims the benefit of Taiwan Patent Application No. 101100644, filed on Jan. 6, 2012, in the Taiwan Intellectual Property Office, the disclosure of which is incorporated herein in its entirety by reference.

BACKGROUND OF THE INVENTION

1. Field of the Invention

The present invention relates to a lens front cap module and an image pickup apparatus of the lens front cap module, and more particularly to lens front cap module and the image pickup apparatus of the lens front cap module having a focusing barrel to drive the lens vane to be shielded or unshielded.

2. Description of the Related Art

As photography becomes increasingly more popular, more and more people use cameras to record details of their life, and consumers seek for a lighter, thinner, shorter and smaller design of the camera, so that they can record their moods anytime and anywhere, and a finer and more user-friendly digital camera is required. Therefore, it is an important subject for major camera manufacturers to produce a camera with smaller volume and more functions. However, it is a challenge and a mission for research and development engineers to implement additional functions to a digital camera within a relatively small available space of the camera.

In most of the conventional designs for shielding and un-shielding the lens front cap, a guide slot, a zooming barrel, a fixed barrel or a driving unit is used for driving the lens front cap module to shield and un-shield a lens vane. However, if the conventional guide slot is used for driving the lens front cap module, the structure will be too complicated, such that the molds cannot be used for manufacturing products with the light, thin, short and compact design. If the zooming barrel is used for driving, the barrel will become relatively small, so that the camera cannot be operated at a tele-end. If the fixed barrel is used for driving, the driving pin of the lens front cap module will be too long, and may be deformed easily to cause damages to the lens front cap module. If a driving unit is installed additionally, then a larger interior space of the camera will be needed, so that the overall cost of the camera will be increased. Therefore, designing an ideal lens front cap module to achieve the light, thin, short and compact effect of the camera and overcome the issue of driving the lens front cap module demands immediate attentions and feasible solutions.

Therefore, the inventor of the present invention designed a lens front cap module and an image pickup apparatus thereof to overcome the shortcomings of the prior art and improve the industrial applications.

SUMMARY OF THE INVENTION

In view of the foregoing shortcomings of the prior art, it is a primary objective of the invention to provide a lens front cap module and an image pickup apparatus thereof to overcome the problems of miniaturizing the image pickup apparatus and lowering the cost.

To achieve the aforementioned objective, the present invention provides a lens front cap module comprising a focusing barrel and a lens front cap body. The focusing barrel is a hollow barrel shaped structure and has an abutting portion formed on an inner wall of the focusing barrel, and the focusing barrel is disposed in a zooming barrel. The lens front cap body further comprises a driving plate and a vane module. The driving plate is installed at an end of the zooming barrel, and has a central window aperture and a driving pin axially extended into the zooming barrel from the driving plate. The vane module is installed on a side of the driving plate opposite to the zooming barrel, and controlling the shielding and un-shielding of the central window aperture. Wherein, when the abutting portion abuts the driving pin, the driving pin drives the driving plate to rotate, so as to drive the vane module to shield the central window aperture.

Wherein, when the zooming barrel and the focusing barrel are axially displaced relatively, the abutting portion abuts or separates from the driving pin.

Wherein, the driving pin is in a long sheet shape, and has a rear end in an oblique shape, such that when the abutting portion abuts the driving pin, the driving pin is dragged by the oblique shape to link the driving plate to rotate.

Wherein, the vane module further comprises a substrate, two vanes, two baffles, two first elastic elements and two second elastic elements, and the two vanes and the two baffles are embedded into the substrate, and each of the first elastic elements is linked to the two vanes and the driving plate, and each of the second elastic elements is linked to the two baffles and the driving plate.

Wherein, the abutting portion abuts the driving pin to rotate the driving plate in a forward direction, such that each of the first elastic elements is stretched to drive the two vanes and the two baffles to shield the central window aperture.

Wherein, the two vanes have a bump respectively, and when the driving plate is rotated in a forward direction, the bump abuts a side of the two baffles to drive the two baffles to shield the central window aperture.

Wherein, when the abutting portion separates from the driving pin, each of the second elastic elements is elastically reversed, and to link the driving plate to rotate in a reverse direction, so as to link the two vanes and the two baffles to open the central window aperture.

Wherein, the two vanes have a sharp pressing portion respectively, and the two baffles have a supporting portion corresponding to the sharp pressing portion, such that when the driving plate is rotated in a reverse direction, each of the first elastic elements is elastically reversed, such that the sharp pressing portion abuts the supporting portion to drive the two baffles and the two vanes simultaneously to open the central window aperture.

To achieve the foregoing objective, the present invention provides an image pickup apparatus, comprising: a focusing barrel, a lens front cap body and an image sensor. The focusing barrel is a hollow barrel shaped structure and disposed in a zooming barrel, and having an abutting portion formed on an inner wall of the focusing barrel. The lens front cap body further comprises a driving plate and a vane module. The driving plate has a central window aperture formed on a side of the zooming barrel and a driving pin axially extended into the zooming barrel from the driving plate. The vane module is provided for shielding and un-shielding the central window aperture and installed on a side of the driving plate opposite to the zooming barrel. The image sensor is installed in the image pickup apparatus for sensing a reflection of light from an object to be photographed passing through the central window aperture. Wherein, when the driving module drives the focusing barrel and the zooming barrel to axially move in a relatively distance, the abutting portion abuts the driving pin to link the vane module to shield the central window aperture, so that the image sensor cannot sense the reflection of light from an object to be photographed.

Wherein, when the zooming barrel and the focusing barrel are axially displaced relatively, the abutting portion abuts or separates the driving pin.

Wherein, the driving pin is in a long sheet shape, and has a rear end in an oblique shape, such that when the abutting portion abuts the driving pin, the driving pin is dragged by the oblique shape to link the driving plate to rotate.

Wherein, the vane module further comprises a substrate, two vanes, two baffles, two first elastic elements and two second elastic elements, and the two vanes and the two baffles are embedded into the substrate, and each of the first elastic elements is linked to the two vanes and the driving plate, and each of the second elastic elements is linked to the two baffles and the driving plate.

Wherein, the abutting portion abuts the driving pin to rotate the driving plate in a forward direction, such that each of the first elastic elements is stretched to drive the two vanes and the two baffles to shield the central window aperture.

Wherein, the two vanes have a bump respectively, and when the driving plate is rotated in a forward direction, the bump abuts a side of the two baffles to drive the two baffles to shield the central window aperture.

Wherein, wherein when the abutting portion separates from the driving pin, each of the second elastic elements is elastically reversed, and to link the driving plate to rotate in a reverse direction, so as to link the two vanes and the two baffles to open the central window aperture.

Wherein, the two vanes have a sharp pressing portion respectively, and the two baffles have a supporting portion corresponding to the sharp pressing portion, such that when the driving plate is rotated in a reverse direction, each of the first elastic elements is elastically contracted, such that the sharp pressing portion abuts the supporting portion to drive the two baffles and the two vanes simultaneously to open the central window aperture.

In summary, the lens front cap module and the image pickup apparatus thereof in accordance with the present invention have one or more of the following advantages:

(1) The lens front cap module and the image pickup apparatus make use of the axial displacement of the focusing barrel and the zooming barrel with respect to each other to achieve the effect of shielding and un-shielding the lens vanes, so as to achieve the effects of simplifying the design of the lens front cap module, reducing the number of components used, lowering the production cost, and providing a better market competitiveness.

(2) The lens front cap module and the image pickup apparatus use the abutting portion of the focusing barrel to abut the driving pin of the driving plate to link and rotate the driving plate, so as to control shielding and un-shielding the barrel vanes, and this design can reduce the number of related components to achieve the minimized design of the camera.

DETAILED DESCRIPTION OF THE PREFERRED EMBODIMENTS

The technical contents and characteristics of the image capturing device and its image processing method in accordance with the present invention will be apparent with the detailed description of a preferred embodiment accompanied with related drawings as follows. For simplicity, same numerals are used in the following preferred embodiment to represent respective same elements.

The lens front cap module of the present invention uses one or more driving modules to axially displace the barrels to achieve the effect of shielding and un-shielding the lens vane, and thus the invention can be applied in an image pickup apparatus such as a digital camera, a smart camera phone and a digital single lens reflex camera, but the invention is not limited to such applications only.

Figure 1:
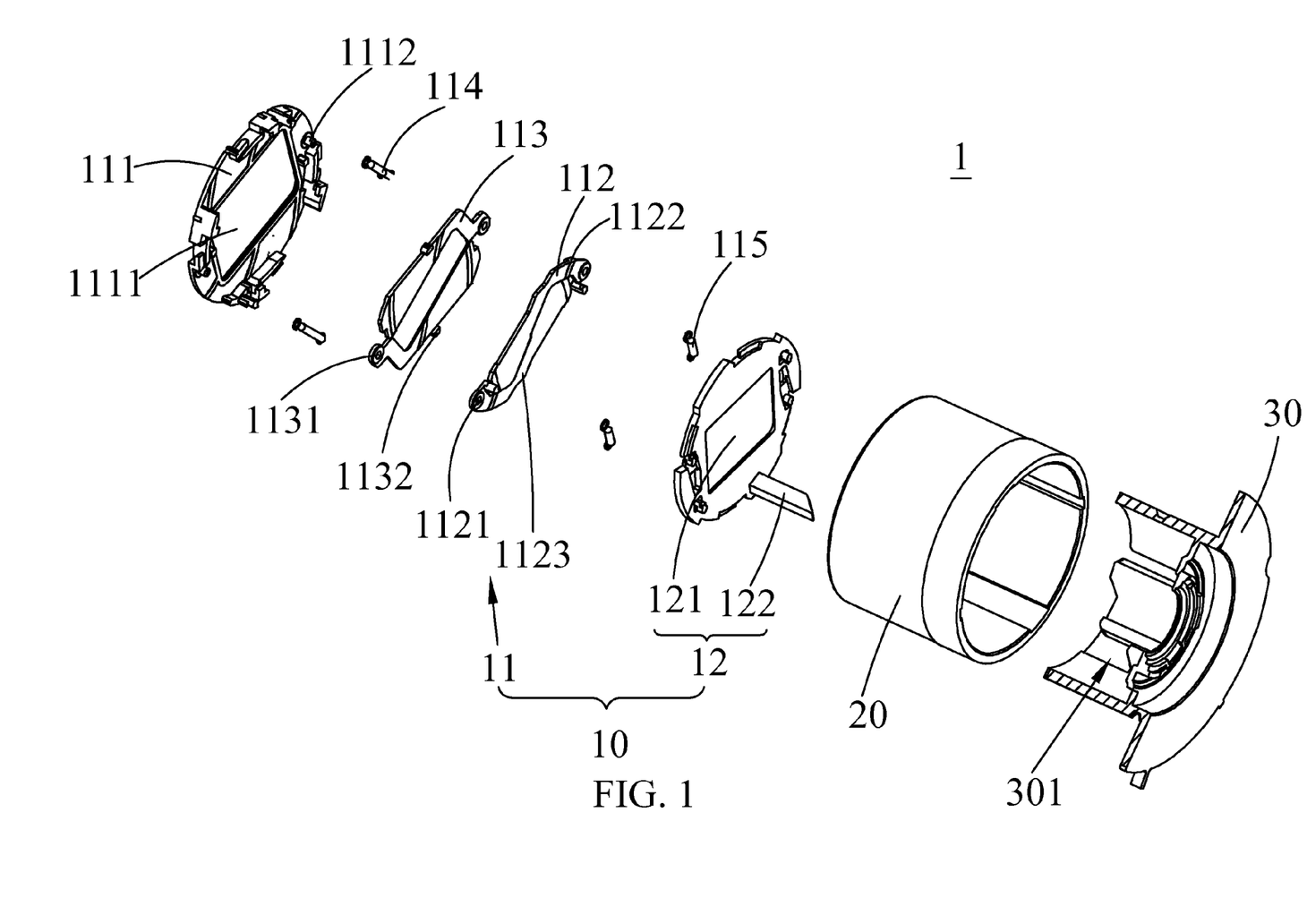
FIG. 1 is an exploded view of a lens front cap module of the present invention.

With reference to FIG. 1 for an exploded view of a lens front cap module in accordance with the present invention, the lens front cap module 1 comprises: a lens front cap body 10, a zooming barrel 20 and a focusing barrel 30. The lens front cap body 10 is installed on a side of the zooming barrel 20. The focusing barrel 30 is installed in the interior of another side of the zooming barrel 20 and has an abutting portion 301 formed on an inner wall of the focusing barrel 30. Wherein, the quantity of barrels can be added according to the requirements of the practical application. In this preferred embodiment, a zooming barrel 20 and a focusing barrel 30 are used for illustrating the invention, but the invention is not limited to such arrangement only.

The lens front cap body 10 further includes a vane module 11 and a driving plate 12. The vane module 11 is installed on a side of the driving plate 12. The driving plate 12 has a central window aperture 121, and a driving pin 122 is axially extended from the driving plate 12 the driving plate 12. The driving pin 122 is in a long sheet shape, and its rear end is in an oblique shape. The driving pin 122 is extended into the zooming barrel 20 and at a position corresponding to the abutting portion 301. The driving module (not shown in the figure) drives the zooming barrel 20 and the focusing barrel 30 to be axially displaced, so that the two barrels are moved close to each other or away from each other. Wherein, the way of driving the two barrels can use the two driving modules for the driving or a driving module together with a grooved design of the barrel for the linking and driving according to the actual requirements of the application. When the two barrels are moved close to each other, the abutting portion 301 abuts the driving pin 122, so that the driving pin 122 is dragged by the oblique shape to link the driving plate 12 to rotate. Wherein, the connection of the driving pin 122 and the driving plate 12 can be an integral formation. If the cost of the mold is taken into consideration, the driving pin 22 and the driving plate 12 can be connected by the assembling method. The vane module 11 further comprises a substrate 111, two vanes 112, two baffles 113, two first elastic elements 114 and two second elastic elements 115. The substrate 111 has a hollow portion 1111 and two hinge points 1112, and the two vanes 112 and the two baffles 113 have a first through hole 1121 and a second through hole 1131 corresponding to the two hinge points 1112 respectively. The two vanes 112 further include two bumps 1122 and a sharp pressing portion 1123, and the two baffles 113 have a supporting portion 1132 corresponding to the sharp pressing portion 1123. Wherein, each elastic element is generally a spring. In this preferred embodiment, a tension spring is used as an example of the elastic element, which is a spiral spring for receiving an axial pulling force.

Figure 2:
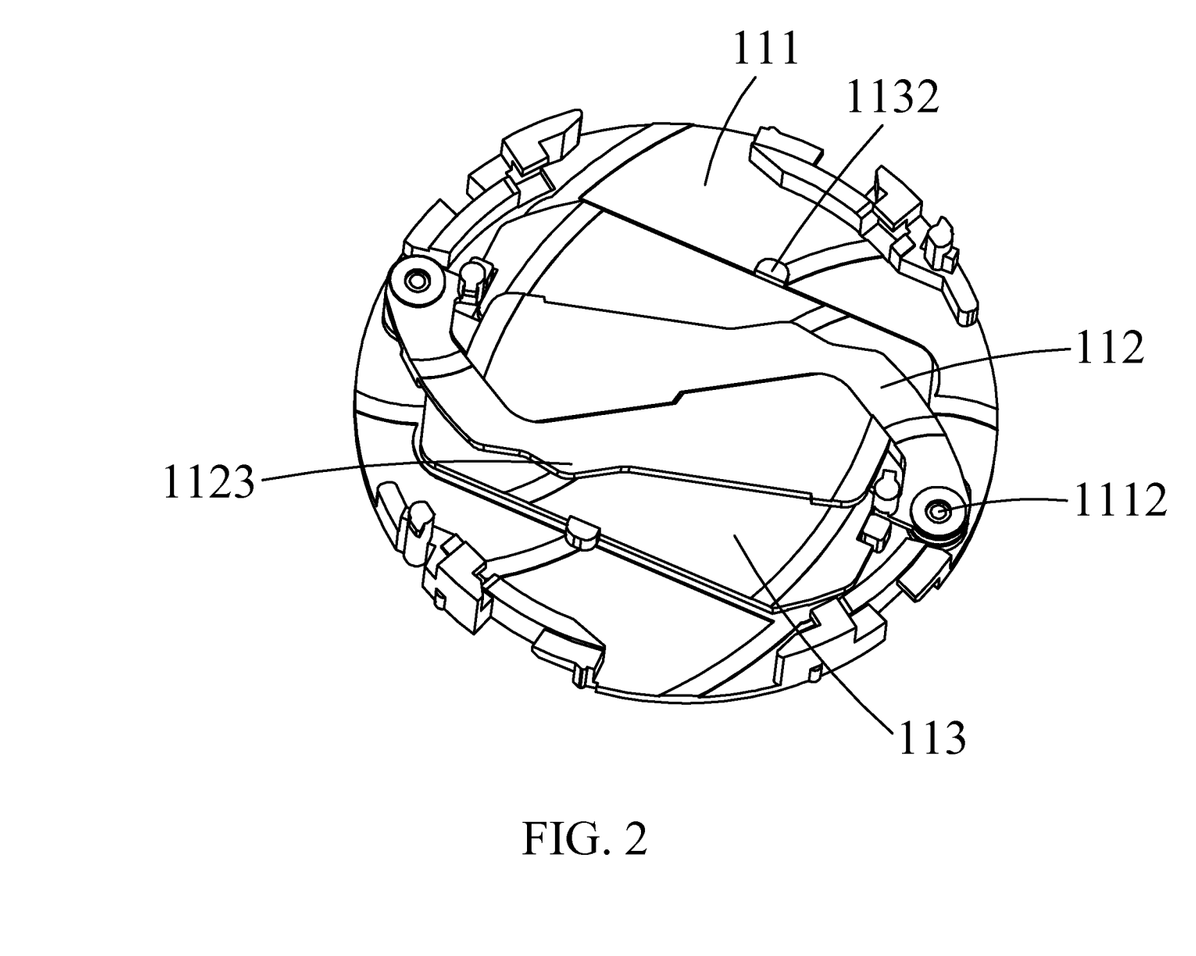
FIG. 2 is a first schematic view of assembling a lens front cap module of the present invention.
Figure 3:
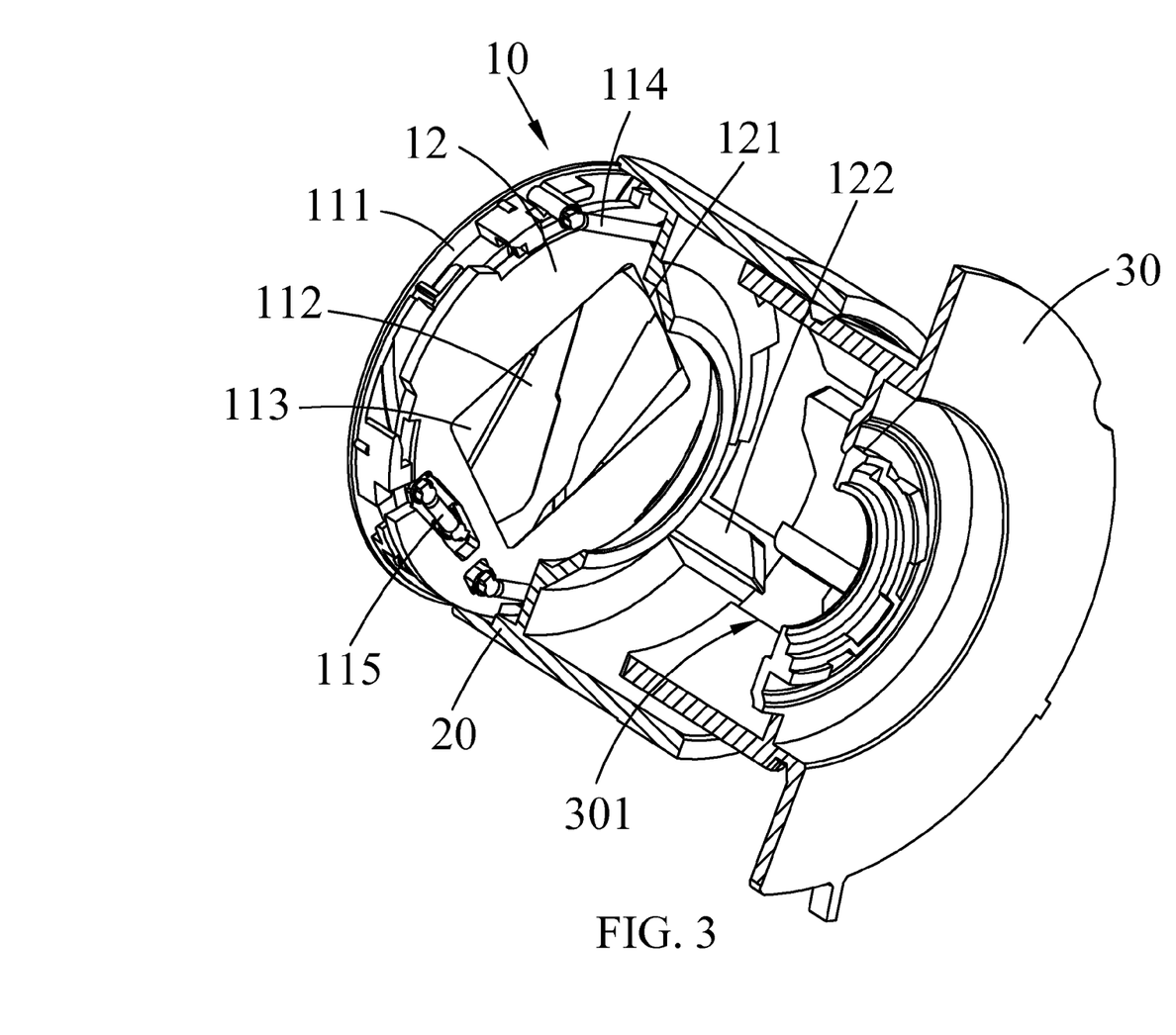
FIG. 3 is a second schematic view of assembling a lens front cap module of the present invention.

With reference to FIGS. 2 and 3 for the first and second schematic views of assembling a lens front cap module of the present invention respectively, the two vanes 112 and the two baffles 113 are pivotally coupled to the two hinge points 1112 of the substrate 111 through the first through hole 1121 and the second through hole 1131, so that the two vanes 112 and the two baffles 113 can be rotated by using the two hinge points 1112 as the axes. The two first elastic elements 114 are coupled to the two vanes 112 and the driving plate 12, and the two second elastic elements 115 are coupled to the substrate 111 and the driving plate 12. When the zooming barrel 20 and the focusing barrel 30 are driven to be axially displaced, the action force for contacting the driving pin 122 and the abutting portion 301 can elastically pull or retract the two first elastic elements 114 and the two second elastic elements 115 to link the two vanes 112 and the two baffles 113, and a first through hole 1121 and a second through hole 1131 are pivotally coupled to the two hinge points 1112, such that each vane 112 and each baffle 113 can be rotated by using each hinge point 1112 as an axis to shield and unshield the central window aperture 121 and the hollow portion 1111. When the two vanes 112 and the two baffles 113 are linked and coupled by the two first elastic elements 114 and the two second elastic elements 115, the hollow portion 1111 and the central window aperture 121 can be shielded completely. On the other hand, when the two vanes 112 and the two baffles 113 are separated, the hollow portion 1111 and the central window aperture 121 can be unshielded completely. Wherein, when the two first elastic elements 114 are stretched or contracted elastically, two vanes 112 are rotated by using the two hinge points 1112 as the axes, and two bumps 1122 and a sharp pressing portion 1123 push the supporting portion 1132 to link the two baffles 113 to shield and unshield the central window aperture 121 and the hollow portion 1111.

Figure 4:
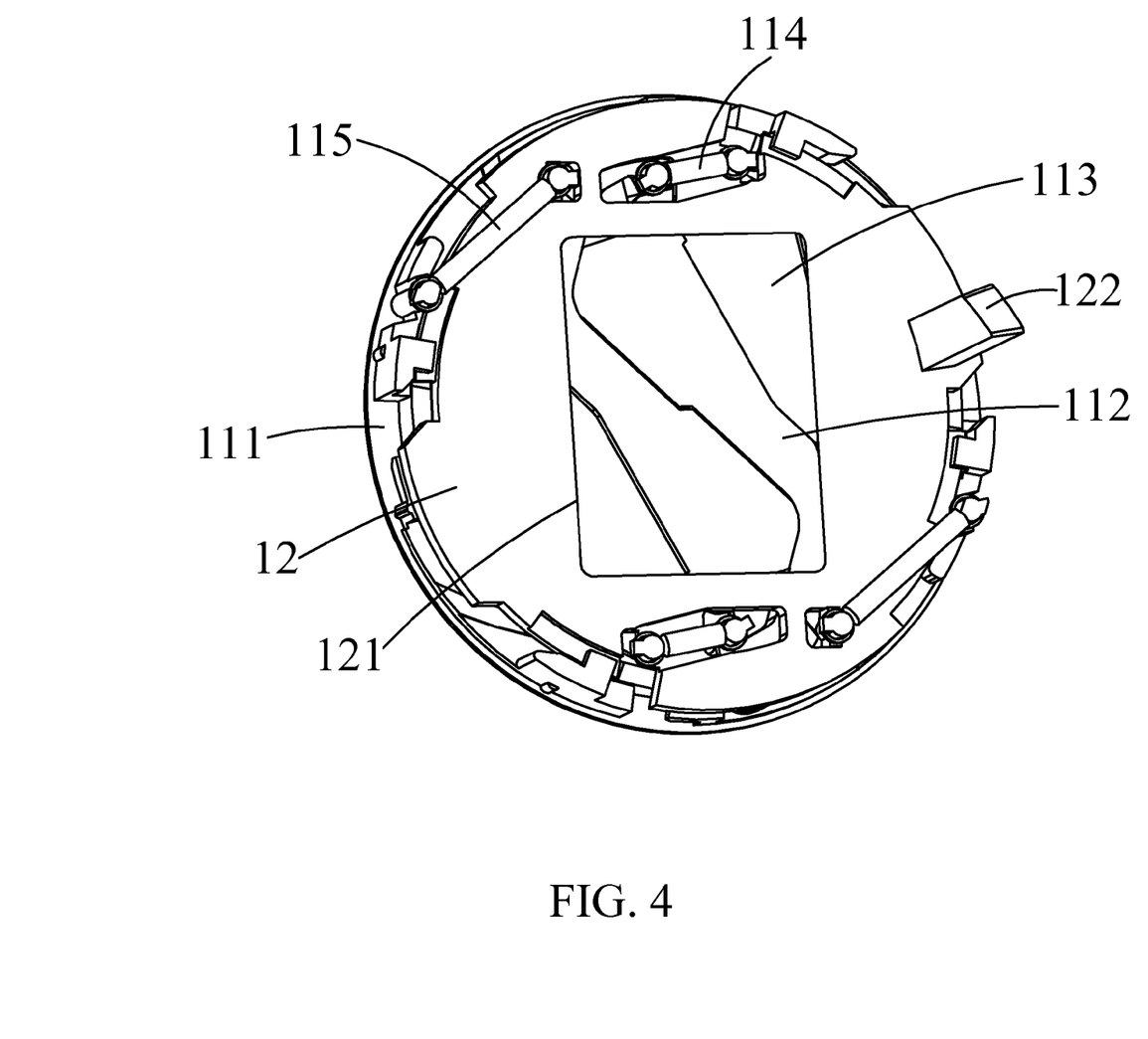
FIG. 4 is a first schematic view of a lens front cap module in accordance with a first preferred embodiment of the present invention.
Figure 5:
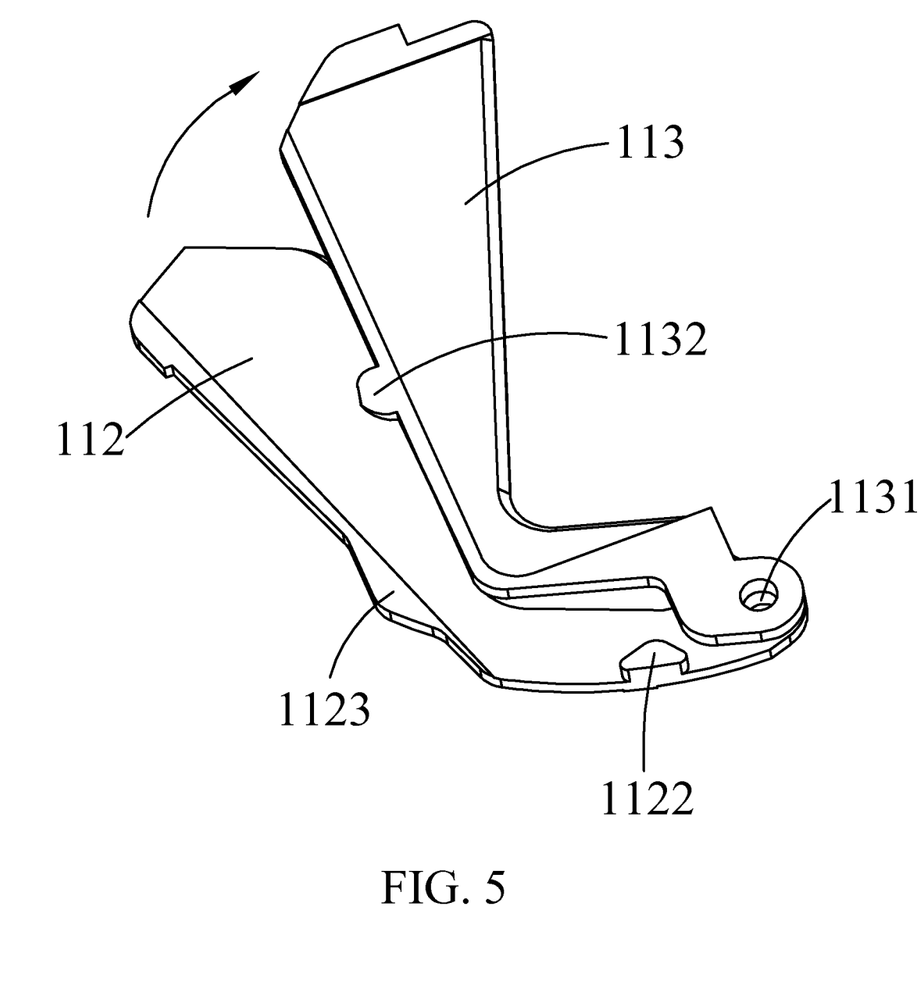
FIG. 5 is a second schematic view of a lens front cap module in accordance with the first preferred embodiment of the present invention.

With reference to FIGS. 4 and 5 for the first and second schematic views of a lens front cap module in accordance with the first preferred embodiment of the present invention respectively, the related link of the lens front cap module 1 is the same as described above, and thus will not be described again. It is noteworthy to point out that when the two barrels are moved close to each other, the abutting portion 301 abuts the driving pin 122, and the driving pin 122 is dragged by the oblique shape to rotate the driving plate 12. The rotation of the driving plate 12 links the vane module 11 to shield the central window aperture 121.

Further, when the zooming barrel 20 and the focusing barrel 30 are driven to be axially displaced towards one another, the driving plate 12 will be axially displaced with the zooming barrel 20, such that the driving pin 122 is abutted by the abutting portion 301. When the driving pin 122 is abutted by the abutting portion 301, the oblique shape drags the driving plate 12 to rotate in a forward direction. In addition, each first elastic element 114 is coupled to the driving plate 12 and each vane 112, and each second elastic element 115 is coupled to the driving plate 12 and the substrate 111. When the driving plate 12 is rotated in a forward direction, each first elastic element 114 is stretched, so as to pull the two vanes 112 to rotate. Each vane 112 is driven by each first elastic element 114 to rotate in a forward direction by using the two hinge points 1112 as axes, so as to shield the central window aperture 121 and the hollow portion 1111. Wherein, the two vanes 112 are rotated in a forward direction, the two bumps 1122 abuts against a side of the two baffles 113, so that the two baffles 113 are rotated in a forward direction accordingly to shield the central window aperture 121 and the hollow portion 1111.

In short, when the zooming barrel 20 and the focusing barrel 30 are driven, abutting portion 301 abuts the driving pin 122, and the driving plate 12 is dragged by the oblique shape of the driving pin 122 to rotate in a forward direction. The driving plate 12 is rotated in a forward direction, so that each first elastic element 114 is stretched, and the two vanes 112 are rotated in a forward direction by using the two hinge points 1112 as axes. The two bumps 1122 abut a side of the two baffles 113, so that the two baffles 113 are rotated in a forward direction. With the rotation of the two vanes 112 and the two baffles 113 in a forward direction, the central window aperture 121 and the hollow portion 1111 are shielded. In other words, when the central window aperture 121 and the hollow portion 1111 are shield, the action force of the driving pin 122 abuts the abutting portion 301 to pull each first elastic element 114 and each second elastic element 115. In other words, when the two barrels are driven and retracted, the central window aperture 121 and the hollow portion 1111 are shielded, and each first elastic element 114 and each second elastic element 115 are stretched. Wherein, the installation position of each elastic element is different, so that the two second elastic elements 115 have greater stretch than the two first elastic elements 114.

Figure 6:
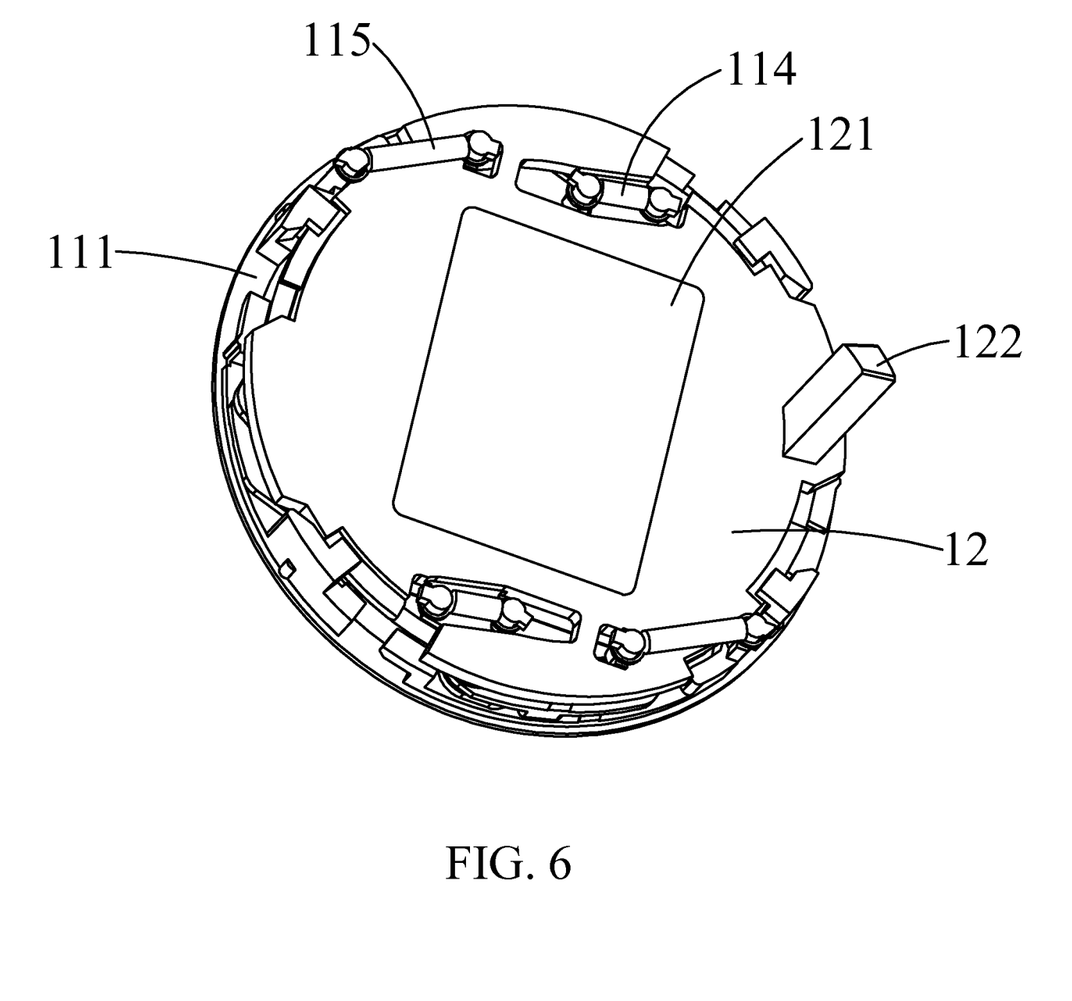
FIG. 6 is a third schematic view of a lens front cap module in accordance with the first preferred embodiment of the present invention.
Figure 7:
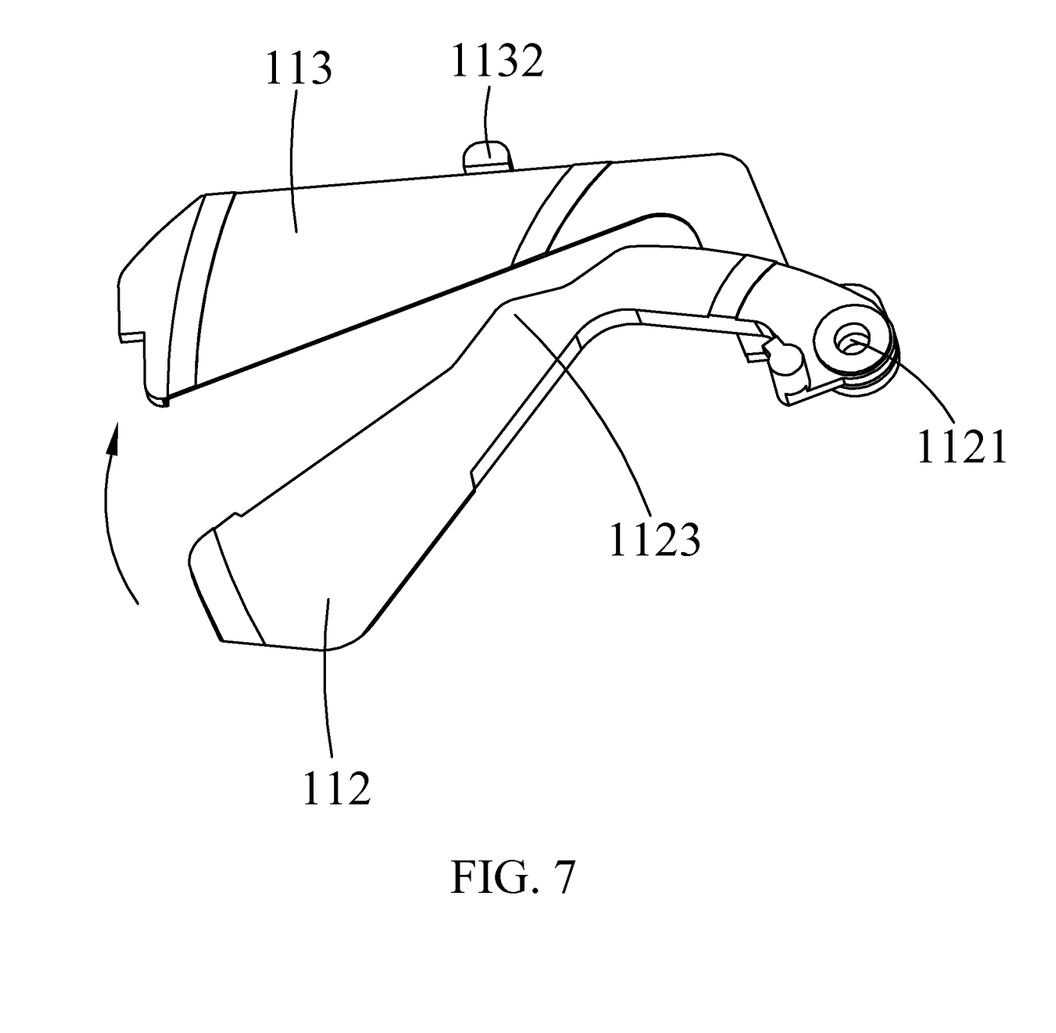
FIG. 7 is a fourth schematic view of a lens front cap module in accordance with the first preferred embodiment of the present invention.

With reference to FIGS. 6 and 7 for the third and fourth schematic views of a lens front cap module in accordance with the first preferred embodiment of the present invention respectively, the related link relation of the lens front cap module 1 is the same as described above, and thus will not be described here. It is noteworthy to point out that when the two barrels are retracted, each elastic element is situated at a stretched state, and each second elastic element 115 has a greater stretch than each first elastic element 114. When the two barrels are driven to move away from each other, the driving pin 122 and the abutting portion 301 are separated, and the resilience of each elastic element drives the driving plate 12 to rotate, so as to unshield the central window aperture 121 and the hollow portion 1111.

Further, when the zooming barrel 20 and the focusing barrel 30 are driven to move away from each other, the driving pin 122 and the abutting portion 301 are separated from each other and the resilience of each second elastic element 115 drives the driving plate 12 to rotate in a reverse direction. When the driving plate 12 is rotated in a reverse direction, each first elastic element 114 is elastically contracted, and the contraction of each first elastic element 114 is smaller than that of each second elastic element 115, so that after each first elastic element 114 is contracted to its original form, the driving plate 12 is still rotated accordingly to abut the two vanes 112. After each vane 112 is abutted by each first elastic element 114, the two hinge points 1112 are used as axes for the rotation in a reverse direction, and the sharp pressing portion 1123 abuts the supporting portion 1132 of the two baffles 113, such that the two baffles 113 are rotated in a reverse direction accordingly. The two vanes 112 and the two baffles 113 are rotated in a reverse direction to unshield the central window aperture 121 and the hollow portion 1111.

In other words, when the zooming barrel 20 and the focusing barrel 30 are driven to axially displace away from each other, the driving pin 122 and the abutting portion 301 are also separated from each other, and thus the mutually abutting forces between the two also disappear. The action force exerted onto each elastic element disappears, so that the elastic element is elastically contracted, and each second elastic element 115 has a greater stretch, and the driving plate 12 is rotated in a reverse direction. Each first elastic element 114 has a smaller stretch, so that after it is contracted to its original form, the driving plate 12 is moved accordingly to abut the two vanes 112 to rotate in a reverse direction by using the two hinge points 1112 as axes. When the two vanes 112 are rotated in a reverse direction, the sharp pressing portion 1123 abuts the supporting portion 1132 of the two baffles 113 to rotate in a reverse direction by using the two hinge points 1112 as axes, so as to shield or unshield the central window aperture 121 and the hollow portion 1111.

Figure 8:
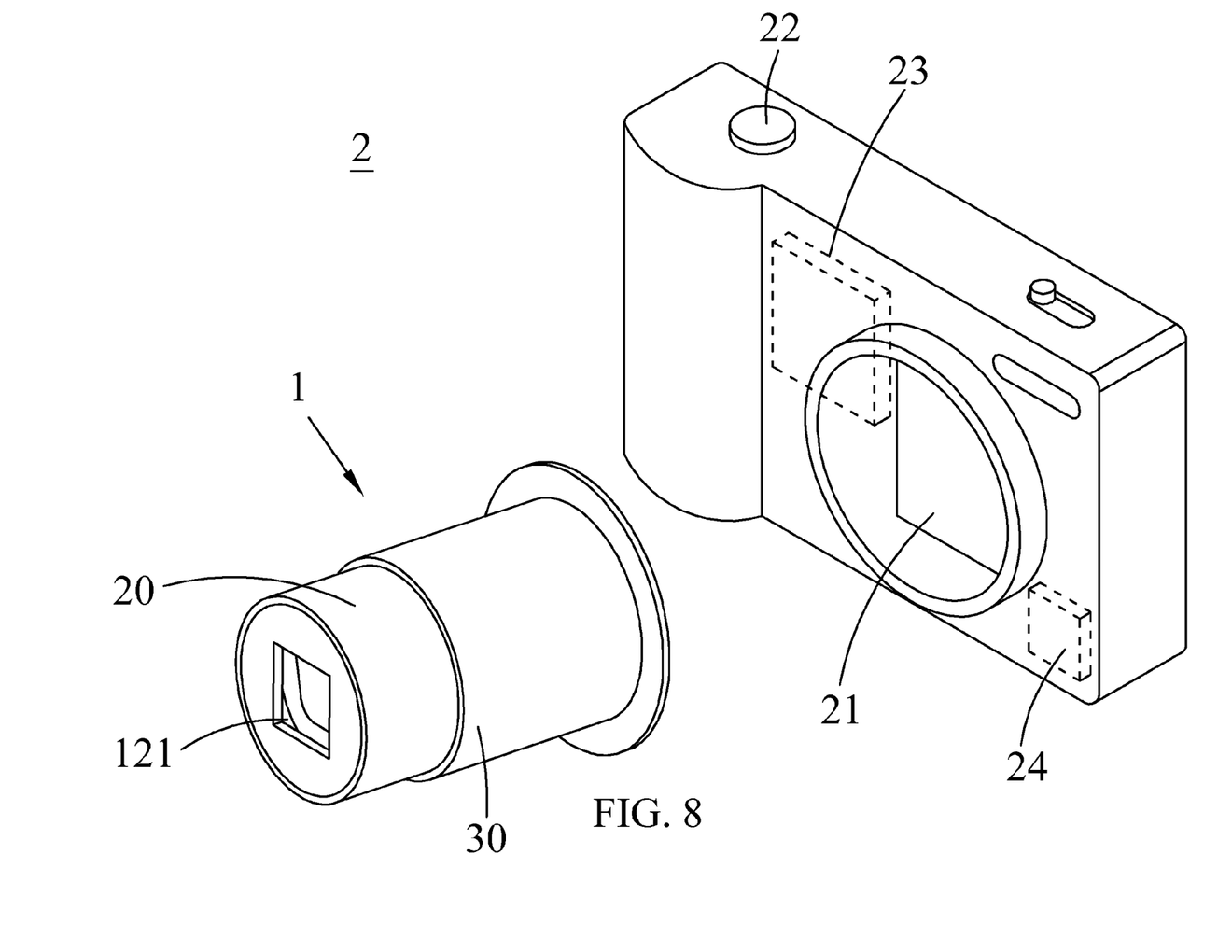
FIG. 8 is a schematic view of a lens front cap module in accordance with a second preferred embodiment of the present invention.

With reference to FIG. 8 for a schematic view of a lens front cap module in accordance with the second preferred embodiment of the present invention, the lens front cap module 1 is applied in an image pickup apparatus 2, and the image pickup apparatus 2 can be a digital camera, a camera phone, a smart phone, a digital video camera, and any portable electronic device with a camera function. To facilitate the understanding of the technical characteristics of the present invention, the digital camera is used as an example for illustrating the present invention, but not intended for limiting the invention. In FIG. 8, the image pickup apparatus 2 comprises a lens front cap module 1, an image sensor 21, a plurality of control buttons (power buttons 22), a control unit 23 and a driving unit 24. The image sensor 21 can be a charge coupled device (CCD) or a complementary metal oxide semiconductor (CMOS). The lens front cap module 1 is installed at the image pickup apparatus 2 and opposite to the image sensor 21. A user can use the control button 22 to control the lens front cap module 1 to shield and unshield the lens vanes through the control unit 23 and driving unit 24, such that a light of an object to be photographed is projected onto the image sensor 21. Wherein, the related link relation of the lens front cap module 1 is the same as described above, and thus will not be described again.

When the user presses the power button 22, the control unit 23 transmits a first control signal to the driving unit 24. After the driving unit 24 receives the signal, the lens front cap module 1 is driven. Wherein, the driving unit 24 can drive the zooming barrel 20 and the focusing barrel 30 to operate or drive one of the barrels to link the other barrel to operate by the grooved design of the barrel. Wherein, the driving unit 24 is generally a DC motor or a stepper motor.

When the user presses the power button 22 to turn off the image pickup apparatus 2, the control unit 23 generates a control signal and transmits the control signal to the driving unit 24, such that the driving unit 24 drives each barrel to retract towards the image pickup apparatus 2. In other words, the zooming barrel 20 and the focusing barrel 30 are driven to move towards each other. When the zooming barrel 20 and the focusing barrel 30 are approaching with one another, the driving pin 122 abuts the abutting portion 301. Since the driving plate 12 is dragged by the oblique shape to rotate in a forward direction, each first elastic element 114 and each second elastic element 115 are stretched. Due to the action force between the driving pin 122 and the abutting portion 301, each first elastic element 114 and each second elastic element 115 are maintained in a condition of being stretched.

Each vane 112 is driven by each first elastic element 114, and two hinge points 1112 are used as axes for a rotation in a forward direction, and two bumps 1122 abut against a side of the two baffles 113, so that the two baffles 113 also use the two hinge points 1112 as axes for the rotation in a forward direction. When the two vanes 112 and the two baffles 113 are rotated in a forward direction, the central window aperture 121 and the hollow portion 1111 are sheltered to complete the operation of turning off the image pickup apparatus 2.

When the user presses the power button 22 to turn on the image pickup apparatus 2, the control unit 23 generates a control signal and transmits the control signal to the driving unit 24, such that the driving unit 24 drives each barrel to push the image pickup apparatus 2 out. In other words, the zooming barrel 20 is driven by the focusing barrel 30 to be axially displaced away from each other. When the two barrels are separated from each other, the driving pin 122 and the abutting portion 301 are also separated from each other, and thus the action force between the two disappears accordingly. Each first elastic element 114 and each second elastic element 115 are elastically contracted since the action force between the driving pin 122 and the abutting portion 301 disappears. With the elastic contraction of each first elastic element 114, the driving plate 12 is driven to rotate in a reverse direction. Since the extended length of each first elastic element 114 is greater than that of each second elastic element 115, therefore after each second elastic element 115 is contracted to its original position, the driving plate 12 will be rotated in a reverse direction to push the two vanes 112, so that the two hinge points 1112 can be used as axes for the rotation in a reverse direction. When the two vanes 112 are rotated in a reverse direction, the sharp pressing portion 1123 pushes the a supporting portion 1132 of the two baffles 113 to drive the two baffles 113 to rotate in a reverse direction. When the two vanes 112 and the two baffles 113 are rotated in a reverse direction simultaneously, the central window aperture 121 and the hollow portion 1111 are opened to complete the operation of turning on the image pickup apparatus 2.

What is claimed is:

1. A lens front cap module, comprising:
    a focusing barrel, being a hollow barrel shaped structure, and having an abutting portion formed on an inner wall of the focusing barrel, and the focusing barrel being disposed in a zooming barrel; and
    a lens front cap body, comprising:
    a driving plate, installed at an end of the zooming barrel, and having a central window aperture and a driving pin axially extended into the zooming barrel from the driving plate; and
    a vane module, installed on a side of the driving plate opposite to the zooming barrel, and controlling the shielding and un-shielding of the central window aperture;
    wherein, when the abutting portion abuts the driving pin, the driving pin drives the driving plate to rotate, so as to drive the vane module to shield the central window aperture.

2. The lens front cap module of claim 1, wherein when the zooming barrel and the focusing barrel are axially displaced relatively, the abutting portion abuts or separates from the driving pin.

3. The lens front cap module of claim 1, wherein the driving pin is in a long sheet shape, and has a rear end in an oblique shape, such that when the abutting portion abuts the driving pin, the driving pin is dragged by the oblique shape to link the driving plate to rotate.

4. The lens front cap module of claim 1, wherein the vane module further comprises a substrate, two vanes, two baffles, two first elastic elements and two second elastic elements, and the two vanes and the two baffles are embedded into the substrate, and each of the first elastic elements is linked to the two vanes and the driving plate, and each of the second elastic elements is linked to the two baffles and the driving plate.

5. The lens front cap module of claim 4, wherein the abutting portion abuts the driving pin to rotate the driving plate in a forward direction, such that each of the first elastic elements is stretched to drive the two vanes and the two baffles to shield the central window aperture.

6. The lens front cap module of claim 5, wherein the two vanes have a bump respectively, and when the driving plate is rotated in a forward direction, the bump abuts a side of the two baffles to drive the two baffles to shield the central window aperture.

7. The lens front cap module of claim 4, wherein when the abutting portion separates from the driving pin, each of the second elastic elements is elastically reversed, and to link the driving plate to rotate in a reverse direction, so as to link the two vanes and the two baffles to open the central window aperture.

8. The lens front cap module of claim 7, wherein the two vanes have a sharp pressing portion respectively, and the two baffles have a supporting portion corresponding to the sharp pressing portion, such that when the driving plate is rotated in a reverse direction, each of the first elastic elements is elastically reversed, such that the sharp pressing portion abuts the supporting portion to drive the two baffles and the two vanes simultaneously to open the central window aperture.

9. An image pickup apparatus, comprising:
  a focusing barrel, being a hollow barrel shaped structure, and having an abutting portion formed on an inner wall of the focusing barrel, and the focusing barrel being disposed in a zooming barrel;
  a lens front cap body, comprising:
  a driving plate, installed on a side of the zooming barrel, and having a central window aperture and a driving pin axially extended into the zooming barrel from the driving plate; and
  a vane module, installed on a side of the driving plate opposite to the zooming barrel, and controlling the shielding and un-shielding of the central window aperture;
  an image sensor, installed in the image pickup apparatus, for sensing a reflection of light from an object to be photographed passing through the central window aperture;
  wherein, when a driving module drives the focusing barrel and the zooming barrel to axially move in a relatively distance, the abutting portion abuts the driving pin to link the vane module to shield the central window aperture, such that the image sensor cannot sense the reflection of light from an object to be photographed.

10. The image pickup apparatus of claim 9, wherein when the zooming barrel and the focusing barrel are displaced axially relatively, the abutting portion abuts or separates the driving pin.

11. The image pickup apparatus of claim 9, wherein the driving pin is in a long sheet shape, and has a rear end in an oblique shape, such that when the abutting portion abuts the driving pin, the driving pin is dragged by the oblique shape to link the driving plate to rotate.

12. The image pickup apparatus of claim 9, wherein the vane module further comprises a substrate, two vanes, two baffles, two first elastic elements and two second elastic elements, and the two vanes and the two baffles are embedded into the substrate, and each of the first elastic elements is linked to the two vanes and the driving plate, and each of the second elastic elements is linked to the two baffles and the driving plate.

13. The image pickup apparatus of claim 12, wherein the abutting portion abuts the driving pin to rotate the driving plate in a forward direction, such that each of the first elastic elements is stretched to drive the two vanes and the two baffles to shield the central window aperture.

14. The image pickup apparatus of claim 12, wherein the two vanes have a bump respectively, and when the driving plate is rotated in a forward direction, the bump abuts a side of the two baffles to drive the two baffles to shield the central window aperture.

15. The image pickup apparatus of claim 12, wherein when the abutting portion separates from the driving pin, each of the second elastic elements is elastically reversed, and to link the driving plate to rotate in a reverse direction, so as to link the two vanes and the two baffles to open the central window aperture.

16. The image pickup apparatus of claim 15, wherein the two vanes have a sharp pressing portion respectively, and the two baffles have a supporting portion corresponding to the sharp pressing portion, such that when the driving plate is rotated in a reverse direction, each of the first elastic elements is elastically reversed, such that the sharp pressing portion abuts the supporting portion to drive the two baffles and the two vanes simultaneously to open the central window aperture.

* * * * *